United States Patent Office 3,278,764
Patented Oct. 11, 1966

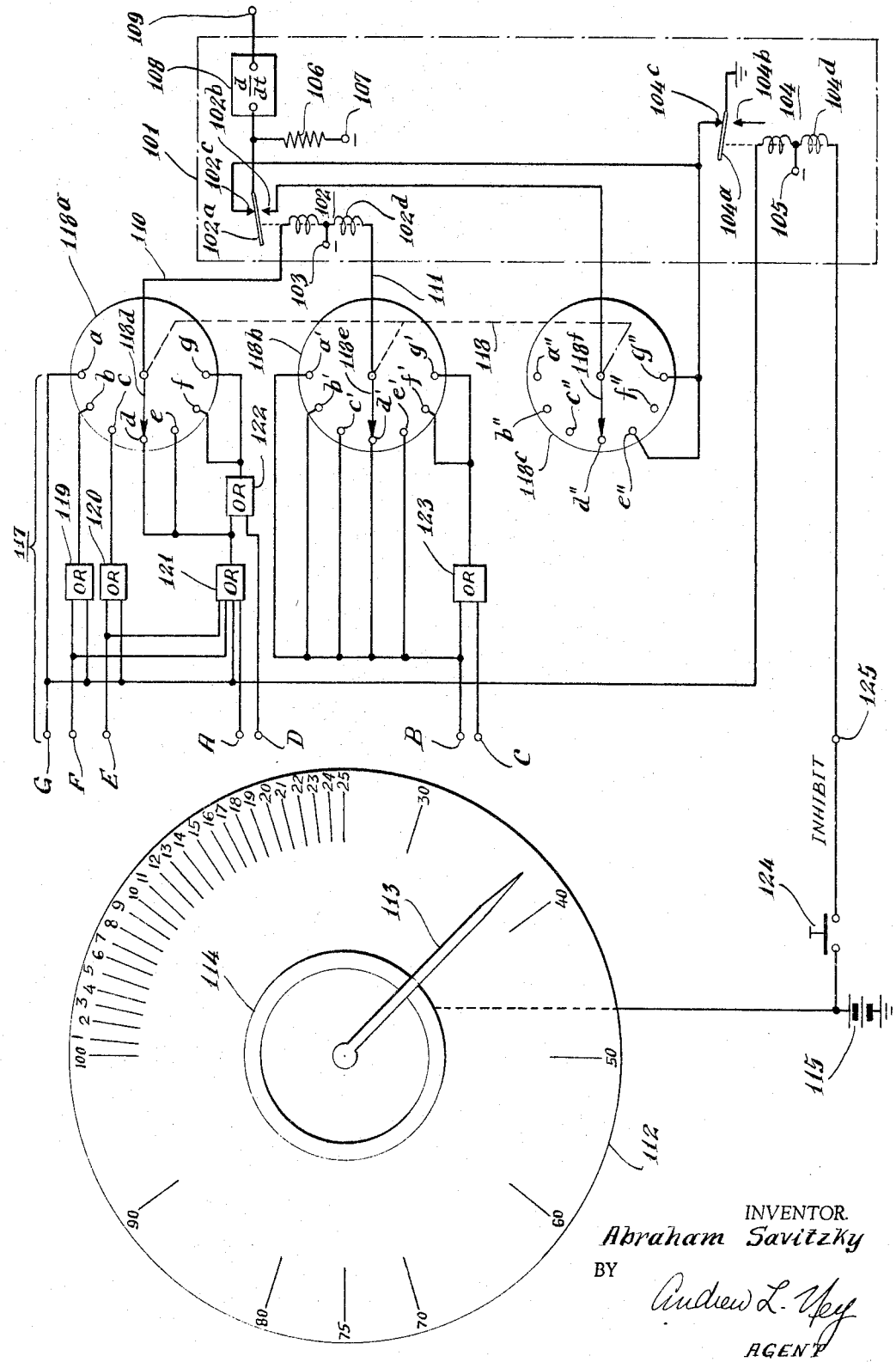

3,278,764
ELECTRICAL SIGNAL GENERATING APPARATUS
Abraham Savitzky, Norwalk, Conn., assignor to The Perkin-Elmer Corporation, Norwalk, Conn., a corporation of New York
Filed Dec. 26, 1962, Ser. No. 247,150
3 Claims. (Cl. 307—106)

The present invention relates to electrical signal generating apparatus and more particularly relates to apparatus for generating electrical signals at selectable intervals. The invention is adapted to generate a selectable number of electrical pulses for each revolution of a rotating shaft which is either synchronized with some other apparatus or is merely rotating at random.

In many electronic and electromechanical applications, it is necessary to generate one or more electrical signals for each revolution of a rotating shaft. These signals may serve either to trigger other portions of the circuitry or to initiate the read-out of data such as shaft position.

Presently known devices of this nature generally utilize a commutator having a rotatable brush linked to the rotating shaft. As the brush rotates with the shaft, it is effective to trigger a pulse generator with each contact it makes with a commutator contact. Thus, the commutator provides the necessary timing for the generation of the pulses.

The presently known devices however, suffer from various limitations and disadvantages. One major limitation is that they lack simple means for selecting trigger intervals other then the basic interval. These devices become extremely complex and expensive when it is desired to provide the operator with a way of selecting one of many different trigger intervals. A major operational disadvantage of the presently known devices is the undesirable effect which may result if the brush bounces across any particular commutator contact thereby making more than one contact and thus causing the generation of spurious pulses. In order to overcome this defect, special care must be taken in the mechanical design and fabrication of these commutators. This obviously adds to the complexity and expense of the device.

It is therefore an object of the present invention, to provide a new and improved electrical signal generator for developing signals, which is particularly adapted to generate a selectable number of electrical pulses for each revolution of a rotating shaft.

It is another object of the present invention to provide electrical signal generating apparatus of the nature described which is not subject to the limitations and disadvantages mentioned above.

It is a further object of the present invention to provide electrical signal generating apparatus of the nature described which is simple in construction and inexpensive to fabricate.

In accordance with the present invention, apparatus for generating electrical signals at selectable intervals includes a signal generator for generating electrical signals whenever the generator is energized. The invention further includes a plurality of terminals and means for sequentially coupling an electrical energy source to the plurality of terminals. The invention additionally includes means for selecting certain of the terminals and for connecting the selected terminals to the signal generator to energize the generator whenever the electrical energy source is coupled to any selected terminal.

For a better understanding of the present invention, together with other and further objects therefore, reference is had to the following description taken in connection with the accompanying drawing and its scope will be pointed out in the appended claims.

Referring to the drawing, there is shown one embodiment of electrical signal generating apparatus constructed in accordance with the present invention.

DESCRIPTION AND OPERATION

Referring to the drawing apparatus for generating electrical signals at selectable intervals constructed in accordance with the present invention includes a signal generator represented generally by the reference numeral 101. This generator may include a first relay 102 having a contact arm 102a and a pair of relay contacts 102b and 102c. The center-tap of the winding 102d of relay 102 is seen to be connected to a source of negative potential represented by the terminal 103. The signal generator 101 may also include a second relay 104 having a contact arm 104a and a pair of relay contacts 104b and 104c. The center-tap of the winding 104d of relay 104 is seen to be connected to a source of negative potential represented by the terminal 105. The contact arm 104a is shown connected directly to ground. Relays 102 and 104 are of the bistable type and characterized by the fact that when energized in one sense the contact arm remains in one position until the relay is energized in the opposite sense. Then the contact arm changes position and remains in this new position until again energized in the first sense. The signal generator 101 may further include a resistor 106 connected between contact arm 102a and a source of negative potential represented by the terminal 107. The signal generator 101 may finally include a differentiating circuit 108 connected between an output terminal 109 and the junction of contact arm 102a and resistor 106. The differentiating circuit 108 may be of conventional construction and operation includes conventional clipping means for eliminating negative going pulses.

Assuming that the differentiating circuit 108 draws little or no current, the junction of contact arm 102a and resistor 106 is at a negative potential equal to the value of source 107 for the conditions shown in the drawing since the circuitry connected to the relay contact 102b leads to an open circuit. Whenever relay 102 is energized in a first sense by the application of positive electrical energy along wire 110, contact arm 102a swings into contact with relay contact 102c and the junction of contact arm 102a and resistor 106 rises to ground potential since relay contact 102c is connected to ground through contact arm 104a. This positive rise in potential will result in the development of a positive pulse by the differentiating circuit 108. Whenever relay 102 is energized in a second sense opposite to the first sense by the application of positive electrical energy along wire 111, contact arm 102a swings back into contact with relay contact 102b and the junction of contact arm 102a and resistor 106 drops back to the negative potential equal to the value of source 107. This drop in potential will result in the development of a negative pulse by differentiating circuit 108, but as previously mentioned, negative pulse are eliminated in the differentiating circuit by suitable means such a simple clipping circuit. The positive pulses supplied to output terminal 109 corresponds to the desired pulses to be generated by the apparatus of the invention while negative drops in potential at the junction of contact arm 102a and resistor 106 signify that relay 102 is reset and ready to be energized again in the first sense.

The apparatus constructed in accordance with the present invention also includes a plurality of terminals and means for sequentially coupling an electrical energy source to these terminals. These elements may take the form a commutator 112 having a rotatable brush 113 and a plurality of commutator contacts 1 through 100, inclusive. Not all of the commutator contacts have been shown in the drawing. The commutator 112 further includes a common contact 114 to which a source of electrical energy in the form of a battery 115 is connected through a wire 116. As the brush 113 rotates it is effective to sequentially couple the battery 115 to the various commutator contacts.

The apparatus constructed in accordance with the present invention further includes means 117 for selecting certain of the commutator contacts 1 through 100, inclusive and for connecting the selected commutator contacts to the signal generator 101 to energize the generator whenever the battery 115 is coupled by way of brush 113 and common contact 114 to any selected commutator contact. Means 117 may include a selector switch 118 composed of three decks, 118a, 118b and 118c. Each switch deck has a movable switch arm 118d, 118e and 118f all mechanically ganged together which makes contact with any one of seven switch contacts on the respective switch deck. These contacts have been designated by the reference characters a through g, inclusive, a' through g', inclusive, and a" through g", inclusive. Each position of the switch arms 118d, 118e and 118f corresponds to a different selectable interval between the pulses available at the output terminal 109. When the switch arms 118d, 118e and 118f make contact with switch contacts, a, a' and a", respectively, one pulse is developed for each revolution of brush 113. Moving the switch arms counterclockwise to each of the other switch contacts will result, respectively, in the development of 2, 5, 10, 20, 50 and 100 pulses for each revoluation of the brush 113.

Means 117 may further include a plurality of OR circuits 119 through 123, inclusive connected between terminals A through G, inclusive and the selector switch 118. OR circuits 119 through 123 may be of conventional construction and operation.

Finally, means 117 may include means for connecting the commutator contacts 1 through 100, inclusive into a predetermined number of groups. These connections have been omitted from the drawing for the sake of clarity, but the contacts would be connected in accordance with Table I and the connections are represented in the drawing by the terminals A through G, inclusive.

TABLE I

| G | F | E | A | B | D | C |
|---|---|---|---|---|---|---|
| 100 | 50 | 20 | 10 | 5 | 2 | 1 |
| | | 40 | 30 | 15 | 4 | 3 |
| | | 60 | 70 | 25 | 6 | 7 |
| | | 80 | 90 | 35 | 8 | 9 |
| | | | | 45 | 12 | 11 |
| | | | | 55 | 14 | 13 |
| | | | | 65 | 16 | 17 |
| | | | | 75 | 18 | 19 |
| | | | | 85 | 22 | 21 |
| | | | | 95 | (1) | (2) |

1 Etc. every even number except 10 and multiples of 10.
2 Etc. every odd number except 5 and multiples of 5.

The number of commutator groups corresponds to the number of different intervals at which pulses are to be generated by the apparatus of the invention. It is to be pointed out that the particular choice of intervals and the desired number of different intervals controls which commutators are connected together and the necessary wiring scheme of means 117.

The operation of the present invention may be most readily understood by way of a specific example. For the position of the selector switch 118 shown in the drawing, the apparatus of the invention is effective to generate ten pulses for each rotation of the commutator brush 113.

Although not shown in the drawing, the commutator brush 113 is caused to rotate by linking it to a rotating shaft by any suitable mechanical arrangement. The shaft, in turn, is driven by a motor synchronized with some other apparatus or rotating at random.

Assuming that brush 113 first contacts commutator contact 1, the battery 115 is coupled to terminal C since commutator contact 1 is seen to be in the C group in Table I. The potential of battery 115 is, in turn, passed through OR circuit 123 to switch contacts f' and g' on switch deck 118b. Since switch arm 118e is not in contact with either of these switch contacts, the battery 115 is not coupled to the signal generator 101 and consequently no pulse is generated by the signal generator at this time.

As the brush 113 contacts commutator contact 2, the battery 115 is coupled to terminal D since commutator contact 2 is seen to be in the D group in Table I. The potential of battery 115 is, in turn, passed through OR circuit 122 to switch contacts f and g on switch deck 118a. Since switch arm 118d is not in contact with either of these switch contacts, the battery 115 is not coupled to the signal generator 101 and consequently no pulse is generated by the signal generator at this time.

As the brush 113 contacts commutator contacts 3 and 4, no pulses are generated by the signal generator 101 since these two commutator contacts are seen to be in the C and D groups, respectively.

As the brush 113 contacts commutator contact 5, the battery 115 is coupled to terminal B since commutator contact 5 is seen to be in the B group in Table I. The potential of battery 115 is, in turn, passed directly to switch contacts a', b', c', d', and e' on switch deck 118b and through OR circuit 123 to switch contacts f' and g' also on switch deck 118b. Since switch arm 118e is in contact with switch contact d' the potential of battery 115 is coupled along wire 111 to relay 102 and is effective to energize this relay. Relay contact 102a, is already in position for this sense of energization and therefore no pulse is generated by the signal generator 101 at this time.

As the brush 113 contacts commutator contacts 6, 7, 8 and 9, no pulses are generated by the signal generator 101 since these commutator contacts are seen to be in the C and D groups.

As the brush 113 contacts commutator contact 10, the battery 115 is coupled to terminal A since commutator contact 10 is seen to be in the A group in Table I. The potential of battery 115 is, in turn, passed through OR circuit 121 to switch contacts d and e on switch deck 118a and further passed through OR circuit 122 to switch contacts f and g also on switch deck 118a. Since switch arm 118d is in contact with switch contact d, the potential of battery 115 is coupled along wire 110 to relay 102 and is effective to energize this relay and cause contact arm 102a to swing into contact with relay contact 102c. This causes the junction of contact arm 102a and resistor 106 to rise to ground potential and results in the development of a positive pulse by the differentiating circuit 108. The bistable nature of relay 102 keeps contact arm 102a in contact with relay contact 102c after the brush 113 breaks contact with commutator contact 10.

As the brush 113 contacts commutator contacts 11, 12, 13, and 14, no pulses are generated by the signal generator 101, since these commutator contacts are seen to be in the C and D groups.

As the brush 113 contacts commutator contact 15, the battery 115 is coupled to teminal B since commutator contact 15 is seen to be in the B group in Table I. The potential of battery 115 is, in turn, passed directly to switch contacts a', b', c', d' and e' and through OR circuit 123 to switch contacts f' and g'. Since switch arm 118e is in contact with switch contact d', the potential of battery 115 is coupled along wire 111 to relay 102, and is effective to energize this relay and return contact arm 102a to relay contact 102b. This causes the junction of contact arm 102a and resistor 106 to drop back to the negative potential equal to the value of source 107. As previously mentioned, this action signifies that the relay 102 is reset and is ready to be energized again in an opposite sense the next time that the potential of battery 115 is coupled along wire 110 to relay 102.

As the brush 113 contacts commutator contacts 16, 17, 18 and 19, no pulses are generated by the signal generator 101 since these commutator contacts are seen to be in the C and D groups.

As the brush 113 contacts commutator contact 20, the battery 115 is coupled to terminal E since commutator contact 20 is seen to be in the E group in Table I. The potential of battery 115 is, in turn, passed through OR circuit 120 to switch contact C on switch deck 118a and through OR circuit 121 to switch contacts d and e also on switch deck 118a. The potential of battery 115 is further passed through OR circuit 122 to switch contacts f and g also on switch deck 118a. Since switch arm 118d is in contact with switch contact d, the potential of battery 115 is coupled along wire 110 to relay 102 and is effective to energize this relay and cause contact arm 102a to swing into contact with relay contact 102c. Again, this results in the development of a positive pulse by the differentiating circuit 108.

By carrying this analysis up through commutator contact 49 it will be seen that as the brush 113 contacts commutator contacts 25, 35 and 45, signal generator 101 is reset but when the brush contacts commutator contacts 30 and 40, positive pulses are generated by the signal generator 101.

As the brush 113 contacts commutator contact 50 the battery 115 is coupled to terminal F since commutator contact 50 is seen to be in the F group in Table I. The potential of battery 115 is, in turn, passed through OR circuit 119 to switch contact b on switch deck 118a and through OR circuit 121 to switch contacts d and e also on switch deck 118a. The potential of battery 115 is further passed through OR circuit 122 to switch contacts f and g also on switch deck 118a. Since switch arm 118d is in contact with switch contact d, the potential of battery 115 is coupled along wire 110 to relay 102 and is effective to energize this relay and cause contact arm 102a to switch into contact with relay contact 102c. Again, this results in the development of a positive pulse by the differentiating circuit 108.

Carrying this analysis up through commutator contact 99, it will be seen that as the brush 113 contacts commutator contacts 55, 65, 75, 85 and 95, signal generator 101 is reset but when the brush contacts commutator contacts 60, 70, 80 and 90, positive pulses are generated by the signal generator 101.

As the brush 113 contacts commutator contact 100, the battery 115 is coupled to terminal G since commutator contact 100 is seen to be in the G group in Table I. The potential of battery 115 is, in turn, passed either directly or through OR circuits 119, 120, 121 and 122 to all the switch contacts on switch deck 118a. Since switch arm 118d is in contact with switch contact d, the potential of battery 115 is coupled along wire 110 to relay 102, and is effective to energize this relay and cause contact arm 102a to swing into contact with relay contact 102c. Again, this results in the development of a positive pulse by the differentiating circuit 108. As the brush 113 continues to rotate and again contacts commutator contact 5, the signal generator 101 is reset.

For the foregoing example, means 117 served to select a first set of commutator contacts composed of the contacts of groups A, E, F and G and effectively connected these contacts to the signal generator 101 to energize the generator in a first sense along wire 110 for generating pulses whenever the battery 115 was coupled to any of these selected contacts. Means 117 also served to select a second set of commutator contacts composed of the contacts of group B and effectively connected these contacts to the signal generator 101 to energize the generator in a second sense along wire 111 for resetting the generator whenever the battery 115 was coupled to any of these selected contacts. Table II below shows which commutator contacts are used for triggering the signal generator 101 and which commutator contacts are used for resetting it at the various selectable intervals at which pulses may be generated by the apparatus of the invention.

TABLE II

| Number of Pulses to be Generated Per Revolution | Groups for Triggering | Groups for Resetting |
|---|---|---|
| 1 | G | B. |
| 2 | F, G | B. |
| 5 | E, G | B. |
| 10 | A, E, F, G | B. |
| 20 | I (A, E, F, G), II (B) | I (A, E, F, G), II (B). |
| 50 | A, D, E, F, G | B, C. |
| 100 | I (A, D, E, F, G), II (B, C). | I (A, D, E, F, G), II (B, C). |

It will be noticed that when either 20 or 100 pulses per revolution are to be generated, Subgroup I serves to reset the signal generator 101 for Subgroup II at the same time that pulses are generated while Subgroup II serves to reset signal generator 101 for Subgroup I at the same time that pulses are generated. When 20 pulses are to be generated for each revolution, switch arm 118f of deck 118c is in contact e″. Relay contact 102b is connected directly to switch arm 118f and switch contact e″ is connected to ground through contact arm 104c of relay 104. The conditions are such, that just prior to the time that the brush 113 makes contact with any of the commutator contacts of the B group, contact arm 102a of relay 102 is in contact with relay contact 102c. At the time that the commutator brush 113 make contact with any of the commutator contacts of the B group, the potential of battery 115 is coupled along wire 111 and is effective to energize this relay and cause contact arm 102a to swing into contact relay contacts 102b. This causes the junction of contact arm 102a and resistor 106 to instantaneously drop toward the value of source 107. As soon as contact arm 102a comes into contact with relay contact 102b, the junction of contact arm 102a and resistor 106 rises to ground potential since relay contact 102b is connected to ground through switch arm 118f and contact arm 104a. This results in the development of positive pulses by the differentiating circuit 108. A similar situation exists when 100 pulses are to be generated for each revolution of brush 113.

As previously mentioned, presently known devices used to generate electrical signals synchronized with rotating shafts suffer from the major operational disadvantage that if the brush bounces across any one commutator contact spurious pulses may be generated. The present invention is not subject to this defect since every succeeding bounce on any one contact results in energizing relay 102 in the same sense as it was energized for the previous contact. Thus, no spurious pulses can be generated.

Although in most applications of the present invention, the pulses to be generated are equally spaced, the invention is not so limited. By spacing the commutator contacts equally, and by rotating the brush 113 at a uniform speed, pulses generated by the apparatus of the invention will be equally spaced. However, if the commutator contacts are not spaced equally or the brush is not rotated at a uniform speed, pulses generated by the apparatus of the present invention will not be equally spaced.

It should be pointed out that the pulse interval may be changed while pulses are being developed by simply changing the setting of selector switch 118. Furthermore, the apparatus may be shut down with the brush 113 at any position and started up again from this position with the apparatus commencing the generation of pulses immediately. However, the apparatus shown in the drawing includes means for starting each series of pulses from the same originating point on the commutator 112. For example, the apparatus may be shut down while the brush 113 is in contact with commutator contact 21 and it may be desirable to start a new series at the origin namely commutator contact 1. This may be accomplished by coupling an electrical energy source such as battery 115 through a momentary switch 124 to a terminal 125 labeled INHIBIT. This is effective to energize relay 104, and cause contact arm 104a to swing away from relay contact 104c. Since this action prevents the junction of contact arm 102a and resistor 106 from ever reaching ground potential, no pulses can be generated by the signal generator 101 so long as this condition prevails. When commutator brush 113 contacts commutator contact 100 the potential of battery 115 is coupled to terminal G and is in turn coupled to relay 104 to energize this relay and return contact arm 104a to relay contact 104c. The apparatus will now generate the desired number of pulses in the normal manner.

While there has been described what is at present, considered to be a preferred embodiment of this invention, it will be obvious to those skilled in the art, that various changes and modifications may be made therein without departing from the invention, and it is therefore intended to cover all such changes and modifications as fall within the true spirit and scope of the invention.

What is claimed is:

1. Apparatus for generating electrical signals at selectable intervals comprising:
    a signal generator for generating said electrical signals whenever said generator is energized in a first sense and for resetting itself whenever energized in a second and opposite sense;
    a source of electrical energy;
    a plurality of terminals;
    means for sequentially coupling said electrical energy source to said plurality of terminals;
    and means for selecting a first set of said terminals and for connecting said first set of selected terminals to said signal generator to energize said generator in said first sense wherever said electrical energy source is coupled to any terminals of said first set and for selecting a second set of said terminals and for connecting said second set of selected terminals to said signal generator to energize said generator in said second sense whenever said electrical energy source is coupled to any terminal of said second set.

2. Apparatus for generating electrical signals at selectable intervals comprising:
    a signal generator for generating said electrical signals whenever said generator is energized in a first sense and for resetting itself whenever energized in a scond and opposite sense;
    a source of electrical energy;
    a commutator having a rotatable brush and a plurality of contacts for sequentially coupling said electrical energy source to said contacts as said brush rotates;
    and means for selecting a first set of said contacts and for connecting said first set of selected contacts to said signal generator to energize said generator in said first sense whenever said electrical energy source is coupled to any contact of said first set and for selecting a second set of said contacts and for connecting said second set of selected contacts to said signal generator to energize said generator in said second sense whenever said electrical energy source is coupled to any contact of said second set.

3. Apparatus for generating equally spaced electrical pulses at selectable intervals comprising:
    a pulse generator for generating said electrical pulses whenever said generator is energized in a first sense and for resetting itself whenever energized in a second and opposite sense;
    a source of electrical energy;
    a commutator having a brush adapted for rotation at a uniform speed and a plurality of equally spaced contacts for sequentially coupling said electrical energy source to said contacts as said brush rotates;
    and means for selecting a first set of said contacts and for connecting said first set of selected contacts to said pulse generator to energize said generator in said first sense whenever said electrical energy source is coupled to any contact of said first set and for selecting a second set of said contacts and for connecting said second set of selected contacts to said pulse generator to energize said generator in said second sense whenever said electrical energy source is coupled to any contact of said second set.

References Cited by the Examiner
UNITED STATES PATENTS
2,767,332   10/1956   Willard _____ 307—132

MILTON O. HIRSHFIELD, *Primary Examiner.*

J. J. SWARTZ, *Assistant Examiner.*